United States Patent
Lee et al.

(10) Patent No.: US 8,385,420 B2
(45) Date of Patent: Feb. 26, 2013

(54) METHOD AND APPARATUS FOR ESTIMATING MOTION VECTOR USING PLURALITY OF MOTION VECTOR PREDICTORS, ENCODER, DECODER, AND DECODING METHOD

(75) Inventors: Tammy Lee, Seoul (KR); Woo-jin Han, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 1189 days.

(21) Appl. No.: 11/964,844

(22) Filed: Dec. 27, 2007

(65) Prior Publication Data

US 2008/0159401 A1    Jul. 3, 2008

(30) Foreign Application Priority Data

Jan. 3, 2007  (KR) .................. 10-2007-0000710
May 7, 2007  (KR) .................. 10-2007-0044226

(51) Int. Cl.
    *H04N 7/12*    (2006.01)
(52) U.S. Cl. ................................. 375/240.16
(58) Field of Classification Search .............. 375/240.16
    See application file for complete search history.

(56) References Cited

U.S. PATENT DOCUMENTS

| | | | |
|---|---|---|---|
| 5,594,504 A | 1/1997 | Ebrahimi | |
| 6,020,933 A | 2/2000 | Lee | |
| 6,249,548 B1 | 6/2001 | Kleihorst et al. | |
| 6,381,277 B1 | 4/2002 | Chun et al. | |
| 6,925,123 B2 | 8/2005 | Subramaniyan et al. | |
| 2003/0156646 A1* | 8/2003 | Hsu et al. | 375/240.16 |
| 2004/0223548 A1 | 11/2004 | Kato et al. | |
| 2005/0123043 A1* | 6/2005 | Wang et al. | 375/240.12 |
| 2006/0018381 A1 | 1/2006 | Luo et al. | |
| 2006/0045186 A1 | 3/2006 | Koto et al. | |
| 2007/0286286 A1* | 12/2007 | Heng et al. | 375/240.16 |

FOREIGN PATENT DOCUMENTS

| | | |
|---|---|---|
| CN | 1592421 A | 3/2005 |
| JP | 8195956 A | 7/1996 |
| JP | 8214316 A | 8/1996 |
| JP | 2000295625 A | 10/2000 |
| JP | 2002520958 A | 7/2002 |
| JP | 200625033 A | 1/2006 |

(Continued)

OTHER PUBLICATIONS

Agarwal, et al., "Performance complexity trade-offs in H.264 Motion Search", Mar. 10, 2005, pp. 1-9, XP002624458, Retrieved from the Internet: URL:http://scien.stanford.edu/pages/labsite/2005/ee398/projects/reports/Agarwal%20Kim%20Gupta%20-%20Project%20Report%20-%20Performance%20Complexity%20Tradeoff%20H264%20Motion%20Search.pdf.

(Continued)

*Primary Examiner* — Mark Rinehart
*Assistant Examiner* — Matthew Hopkins
(74) *Attorney, Agent, or Firm* — Sughrue Mion, PLLC

(57) ABSTRACT

Provided are a method and apparatus for estimating a motion vector using a plurality of motion vector predictors, an encoder, a decoder, and a decoding method. The method includes calculating spatial similarities between the current block and the plurality of neighboring partitions around the current block, selecting at least one of the neighboring partitions based on the calculated spatial similarities, and estimating a motion vector of the selected partition as the motion vector of the current block.

40 Claims, 9 Drawing Sheets

FOREIGN PATENT DOCUMENTS

| | | |
|---|---|---|
| JP | 200674474 A | 3/2006 |
| JP | 200674520 A | 3/2006 |
| KR | 10-2006-0090942 A | 8/2006 |

OTHER PUBLICATIONS

Ismaeil, et al., "Efficient motion estimation using spatial and temporal motion vector prediction", International Conference on Image Processing, ICIP 99. Proceedings. 1999—Kobe, Japan, vol. 1, Oct. 24, 1999-Oct. 28, 1999, pp. 70-74, XP010369195, IEEE, Piscataway, NJ, USA, DOI:10.1109/ICIP.1999.821568, ISBN: 978-0-7803-5467-8.

Jung, et al., "Competition-Based Scheme for Motion Vector Selection and Coding", ITU Study Group 16- Video Coding Experts Group—ISO/IEC MPEG & ITU-T VCEG (ISO/IEC JTC1/SC29/WG11 and ITU-T SG16 Q6), XX, XX, No. VCEG-ACO6r1, Aug. 2, 2006, total 7 pages, XP030003490.

Liu, et al., "Adaptive Motion Vector Prediction Based on Spatiotemporal Correlation", Conference on Wireless Communications, Networking and Mobile Computing WICOM 2006. Intenational, IEEE, PI, Sep. 1, 2006, pp. 1-4, XP031074482, ISBN: 978-1-4244-0517-6.

Rehan, et al., "A new motion-estimation technique for efficient video compression", Conference on Communications, Computers and Signal Processing. 10 Years PACRIM 1987-1997—Networking the Pacific RIM. 1997 IEEE Pacific RIM. Victoria, BC, Canada, vol. 1, Aug. 20, 1997-Aug. 22, 1997, pp. 326-329, XP010244980, New York, NY, USA, IEEE, US, DOI: 10.1109/PACRIM.1997.619965, ISBN: 978-0-7803-3905-7.

Communication dated Mar. 29, 2011 in counterpart European Application No. 07851807.3.

Communication dated Apr. 18, 2011 in counterpart European Application No. 07851807.3.

Office Action dated Jan. 26, 2011 issued by the State Intellectual Property Office of P.R. China in counterpart Chinese Application No. 200780049240.9.

Communication dated Feb. 16, 2012 from the State Intellectual Property Office of P.R. China in a counterpart application No. 200780049240.9.

Communication dated Sep. 11, 2012 issued by the Japanese Patent Office in counterpart Japanese Application No. 2009-544785.

* cited by examiner

METHOD AND APPARATUS FOR ESTIMATING MOTION VECTOR USING PLURALITY OF MOTION VECTOR PREDICTORS, ENCODER, DECODER, AND DECODING METHOD

CROSS-REFERENCE TO RELATED PATENT APPLICATION

This application claims priority from Korean Patent Application No. 10-2007-0000710, filed on Jan. 3, 2007 in the Korean Intellectual Property Office, the disclosure of which is incorporated herein in its entirety by reference.

BACKGROUND OF THE INVENTION

1. Field of the Invention

Methods and apparatuses consistent with the present invention generally relate to video coding and decoding, and more particularly, to estimating a motion vector using a plurality of motion vector predictors.

2. Description of the Related Art

Inter-frame and intra-frame predictions are widely used video encoding techniques. Intra-frame prediction uses a high correlation between gray levels of adjacent pixels in a single frame. Inter-frame prediction uses similarities between consecutive frames in a video sequence. As long as a sharp change does not occur in a moving picture, many parts of the moving picture change little between consecutive frames. In particular, motion-vector estimation is one of a variety of video encoding techniques used in inter-frame prediction. Motion-vector estimation is designed to process an image by differentially encoding motion vectors obtained by motion estimation. Generally, a motion vector of a block has a close correlation with a motion vector of a neighboring partition. For this reason, the amount of bits to be encoded can be reduced by predicting a motion vector of a current block from the motion vector of a neighboring partition and encoding only a differential vector between these two motion vectors.

FIGS. 1A and 1B illustrate neighboring partitions used for related art motion estimation.

Referring to FIG. 1A, a current macroblock E and its neighboring partitions A, B, and C are the same in shape, and predictive encoding of a motion vector uses the median value of horizontal components and vertical components of motion vectors of a block A located to the left of the current macroblock E, a block B located above the current block E, and a block C located above and to the right of the current block E.

In FIG. 1B, the current macroblock E and its neighboring partitions A, B, and C are different in shape, and the motion vector of the current macroblock E is estimated as follows.

(1) If a neighboring partition located to the left of the current macroblock E is divided into several blocks, a block A located uppermost among those blocks is used for motion estimation. If a neighboring partition located above the current macroblock E is divided into several blocks, a block B located leftmost among those blocks is used for motion estimation. The median value of horizontal components and vertical components of motion vectors of the block A, the block B, and a block C located above and to the right of the current macroblock E is used for predictive encoding of the motion vector of the current macroblock E.

(2) However, if the current macroblock E to be encoded is not a regular square in shape, i.e., the current macroblock E is composed of 16×8 or 8×16 pixels, the motion vector of the current macroblock E is estimated based on the size of a motion compensation block without using the median value, as follows.

(i) If the current macroblock E is composed of 16×8 pixels, the block B located above the current block E and the block A located to the left of the current macroblock E are used for motion estimation.

(ii) If the current macroblock E is composed of 8×16 pixels, the block A located to the left of the current macroblock E and the block C located above and to the right of the current block E are used for motion estimation.

(3) In a skip macroblock mode, estimation is performed as described in (1).

As described above, at least one neighboring block may be used for estimation of a motion vector of the current block. However, according to the prior art, only typical neighboring blocks are available and, out of those neighboring blocks, a block that is similar to the current block, i.e., the block having the same motion as the current block, is useful, but the other blocks are not. Therefore, there is a need to use a plurality of other neighboring blocks for accurate estimation as well as those typical neighboring blocks. In this case, processing of information about neighboring blocks used for motion estimation is also required.

SUMMARY OF THE INVENTION

The present invention provides a method and apparatus for estimating a motion vector, in which useful neighboring partitions are estimated so as to estimate a motion vector of a current block and information about estimated neighboring partitions is processed.

According to one aspect of the present invention, there is provided a method of estimating a motion vector of a current block. The method includes calculating spatial similarities between the current block and a plurality of neighboring partitions around the current block, selecting at least one of the neighboring partitions based on the calculated spatial similarities, and estimating a motion vector of the selected partition as the motion vector of the current block.

During the calculation of the spatial similarities, an average value of pixels of the current block and an average value of pixels of each of the neighboring partitions may be used and the average value of the pixels of the current block may be calculated using pixels that touch the current block from among the pixels of the neighboring partitions.

During the calculation of the spatial similarities, the spatial similarities may be allocated to the neighboring partitions according to a spatial order previously agreed between an encoder and a decoder.

The method may further include transmitting motion information between the motion vector of the current block and the estimated motion vector of the current block and partition information for reconstruction of the motion vector of the current block.

In the estimating, when a plurality of neighboring partitions are selected, a motion vector of one of the selected neighboring partitions may be estimated as the motion vector of the current block.

In the estimating, when a plurality of neighboring partitions are selected, the median value of motion vectors of the selected neighboring partitions may be estimated as the motion vector of the current block.

In the estimating, when a plurality of neighboring partitions are selected, a sum of weighted motion vectors of the selected neighboring partitions may be estimated as the motion vector of the current block.

In the estimating, a motion vector of a partition in a reference frame, which is located in the spatially same position as the current block, may be estimated as the motion vector of the current block.

According to another aspect of the present invention, there is provided a method of estimating a motion vector of a current block. The method includes searching at least one reference frame using motion vectors of a plurality of neighboring partitions around the current block in order to search for blocks corresponding to the current block, calculating similarities between neighboring pixels that are adjacent to each of the found blocks and neighboring pixels that are adjacent to the current block, and estimating one of the motion vectors of the partitions as the motion vector of the current block based on the calculation result.

According to another aspect of the present invention, there is provided a computer-readable recording medium having recorded thereon a program for executing the method.

According to another aspect of the present invention, there is provided an apparatus for estimating a motion vector of a current block using motion vectors of a plurality of neighboring partitions around the current block. The apparatus includes a spatial similarity calculation unit calculating spatial similarities between the current block and the plurality of neighboring partitions around the current block, a partition selection unit selecting at least one of the neighboring partitions based on the calculated spatial similarities, and a motion vector estimation unit estimating a motion vector of the selected partition as the motion vector of the current block.

According to another aspect of the present invention, there is provided a video encoder. The video encoder includes a motion estimation unit generating a current block and a motion vector of each of a plurality of neighboring partitions around the current block, a motion vector estimation unit calculating spatial similarities between the current block and the plurality of neighboring partitions around the current block, selecting at least one of the neighboring partitions based on the calculated spatial similarities, and estimating a motion vector of the selected partition as the motion vector of the current block, and an entropy-coding unit performing entropy-coding on motion information between the motion vector of the current block and the estimated motion vector of the current block and partition information for reconstruction of the motion vector of the current block.

According to another aspect of the present invention, there is provided a video decoder. The video decoder includes an entropy-decoding unit performing entropy-decoding on a residual block, motion information, and partition information from an encoded bitstream, a motion vector estimation unit calculating spatial similarities between a current block and a plurality of neighboring partitions around the current block, selecting at least one of the neighboring partitions based on the calculated spatial similarities, estimating a motion vector of the selected partition as the motion vector of the current block, adding the decoded motion information to the estimated motion vector of the current block in order to reconstruct the motion vector of the current block, and a macroblock reconstruction unit reconstructing the current block from the decoded residual block using the reconstructed motion vector.

According to another aspect of the present invention, there is provided a decoding method. The decoding method includes performing entropy-decoding on a residual block, motion information, and partition information from an encoded bitstream, calculating spatial similarities between a current block and a plurality of neighboring partitions around the current block, selecting at least one of the neighboring partitions based on the calculated spatial similarities, estimating a motion vector of the selected partition as the motion vector of the current block, adding the decoded motion information to the estimated motion vector of the current block in order to reconstruct the motion vector of the current block, and reconstructing the current block from the decoded residual block using the reconstructed motion vector.

According to another aspect of the present invention, there is provided a computer-readable recording medium having recorded thereon a program for executing the decoding method.

BRIEF DESCRIPTION OF THE DRAWINGS

The above and other aspects of the present invention will become more apparent by describing in detail an exemplary embodiment thereof with reference to the attached drawings in which.

DETAILED DESCRIPTION OF EXEMPLARY EMBODIMENTS OF THE INVENTION

Figure 1A:
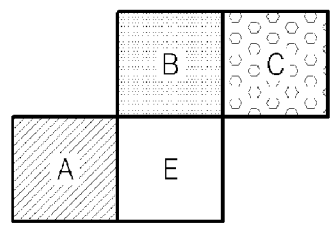
FIGS. 1A and 1B illustrate neighboring partitions used for conventional motion estimation.
Figure 1B:
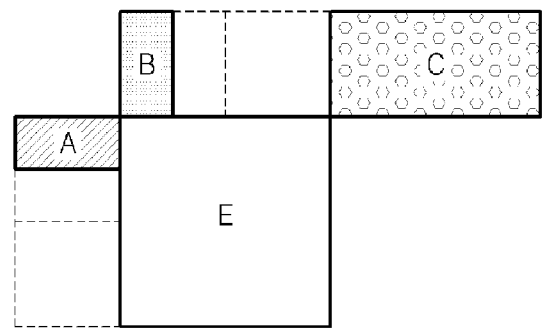

Hereinafter, an exemplary embodiment of the present invention will be described in detail with reference to the accompanying drawings. It should be noted that like reference numerals refer to like elements illustrated in one or more of the drawings. It would be obvious to those of ordinary skill in the art that many specifics like elements of a circuit are provided only to facilitate understanding of the present invention and the present invention can be implemented without those specifics. In the following description of the present invention, a detailed description of known functions and configurations incorporated herein will be omitted for conciseness and clarity.

Figure 2:
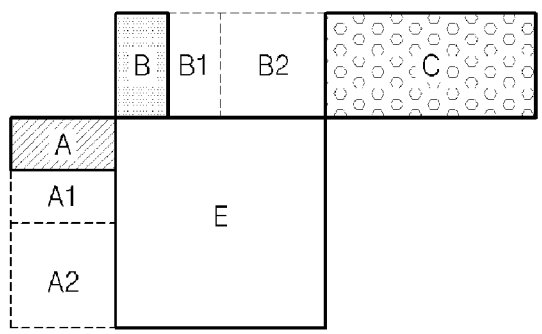
FIG. 2 illustrates neighboring partitions used for motion estimation according to an exemplary embodiment of the present invention.

FIG. 2 illustrates neighboring partitions used for motion estimation according to an exemplary embodiment of the present invention. Referring to FIG. 2, a motion vector of a current block E can be estimated using not only neighboring partitions A, B, and C according to the related art but also by using other neighboring partitions A1, A2, B1, and B2. The current block E may be a 16×16 macroblock and the size of a neighboring partition may be smaller than the current block E and may be one of 16×8, 8×16, 8×4, 4×8, and 4×4.

Figure 3A:
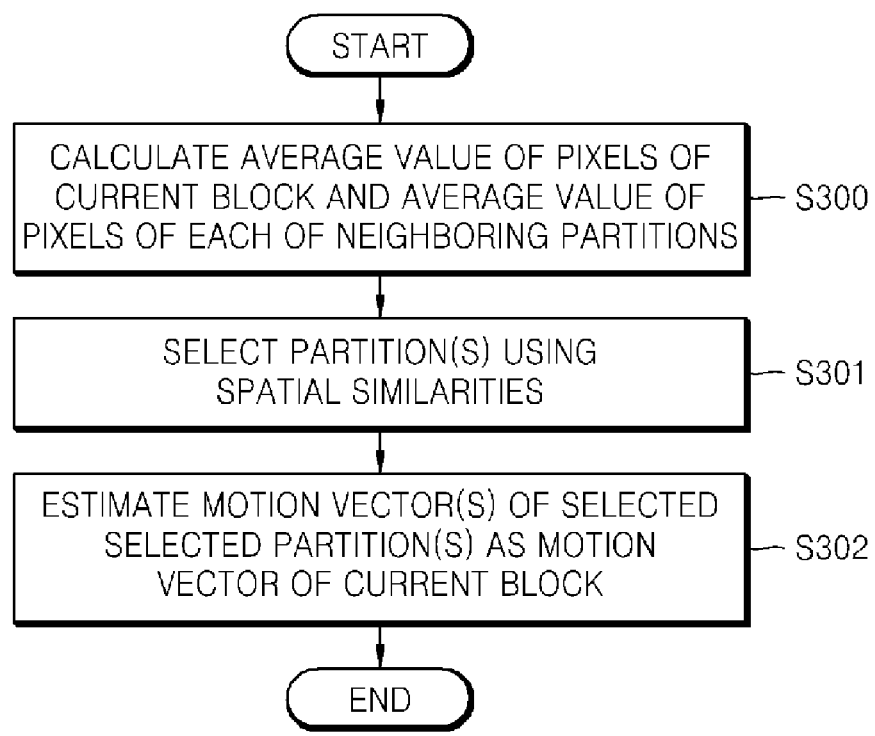
FIG. 3A is a flowchart of a method of estimating a motion vector of a current block according to an exemplary embodiment of the present invention.
Figure 4A:
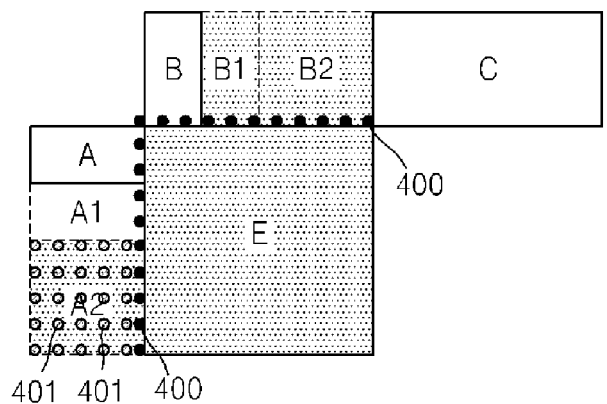
FIG. 4A is a view for explaining calculation of spatial similarities between the current block and its neighboring partitions according to an exemplary embodiment of the present invention.

FIG. 3A is a flowchart of a method of estimating a motion vector of a current block according to an exemplary embodiment of the present invention, and FIG. 4A is a view for explaining calculation of spatial similarities between the current block and its neighboring partitions according to an exemplary embodiment of the present invention.

Referring to FIG. 3A, an average value of pixels of the current block E and an average value of pixels of each of the neighboring partitions A, B, A1, A2, B1, B2, and C are calculated in operation S300, in order to select neighboring partitions having spatial similarity with the current block E.

In operation S301, the similar neighboring partitions are selected as predictors of the current block using the calculated averages. The predictors are blocks that are to be compared with the current block for obtaining a motion vector difference (MVD).

More specifically, when the average value of pixels of the current block is a first average and the average value of pixels of a neighboring partition is a second average, the neighboring partition is selected as a predictor of the current block if the absolute value of a difference between the first average and the second average is less than a predetermined threshold.

In particular, the average value of pixels of the current block and the average value of pixels of each of a plurality of neighboring partitions around the current block may be used for calculation of a spatial similarity and the average value of pixels of the current block may be calculated using pixels that touch the current block from among the pixels of the neighboring partitions. During calculation of a spatial similarity, the spatial similarity is allocated to each of the neighboring partitions according to a spatial order agreed previously between an encoder and a decoder.

In operation S302, a motion vector of the selected neighboring partition is estimated as the motion vector of the current block. At least two neighboring partitions may have been selected in operation S301, as will be described with reference to FIG. 4.

FIG. 4A is a view for explaining calculation of spatial similarities between the current block and its neighboring partitions according to an exemplary embodiment of the present invention. In FIG. 4A, it is assumed that the current block E is a 16×16 macroblock, a neighboring partition A is composed of 8×4 pixels, a neighboring partition A1 is composed of 8×4 pixels, a neighboring partition A2 is composed of 8×8 pixels, a neighboring partition B is composed of 4×8 pixels, a neighboring partition B1 is composed of 4×8 pixels, a neighboring partition B2 is composed of 8×8 pixels, and a neighboring partition C is composed of 16×8 pixels. In addition, it is assumed that an absolute value of a difference between an average value of pixels of the current block E and an average value of pixels of each of the neighboring partitions A2, B1, and B2 is less than a predetermined threshold.

According to an exemplary embodiment of the present invention, a motion vector of the current block E can be estimated as follows in (i), (ii), (iii) or (iv).

(i) One of the neighboring partitions A2, B1, and B2 is selected and a motion vector of the selected neighboring partition is estimated as the motion vector of the current block E, (ii) A combination of the neighboring partitions A2, B1, and B2, e.g., a combination formula $_3C_2$, is selected and the median value of x components and y components of motion vectors of the selected neighboring partitions is estimated as the motion vector of the current block E.

(iii) If motion vectors of the neighboring partitions A2, B1, and B2 are MVPA2, MVPB1, and MVPB2, a sum of weighted motion vectors, e.g., $\alpha*MVPA2+\beta*MVPB1+\gamma*MVPB2$, is estimated as the motion vector of the current block E.

Information about neighboring partitions, i.e., partition information, complies with a rule previously reserved for a decoder. For example, the partition information may indicate that a motion vector of a neighboring partition located to the left of the current block from among neighboring partitions having spatial similarities with the current block is estimated as the motion vector of the current block or the median value of motion vectors of the neighboring partitions is estimated as the motion vector of the current block. When weights are used, weight coefficients ($\alpha, \beta, \gamma$) have to be transmitted to a decoder as a partition type.

(iv) A motion vector of a partition in a reference frame, which is located in a position that spatially corresponds to that of the current block, may be estimated as the motion vector of the current block. A partition in a temporally close reference frame, which is located in a position that spatially corresponds to that of the current block, i.e., the partition in the reference frame, which is located in the spatially same position as the current block, is highly likely to have a motion that is similar to that of the current block. Thus, the motion vector of the partition, which is located in the spatially same position as the current block, may be estimated as the motion vector of the current block.

Information about neighboring partitions, i.e., partition information, complies with a rule previously reserved for a decoder. For example, the partition information may indicate that a motion vector of a neighboring partition located to the left of the current block from among neighboring partitions having spatial similarities with the current block is estimated as the motion vector of the current block or the median value of motion vectors of the neighboring partitions is estimated as the motion vector of the current block. When weights are used, weight coefficients ($\alpha, \beta, \gamma$) have to be transmitted to a decoder as a partition type.

Figure 3B:
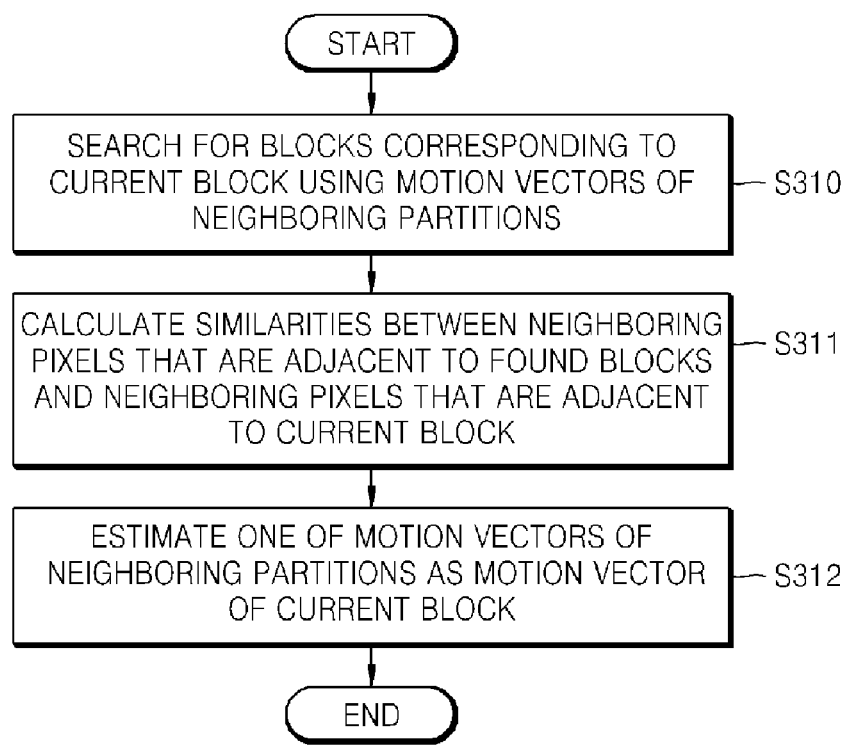
FIG. 3B is a flowchart of a method of estimating a motion vector of a current block according to another exemplary embodiment of the present invention.
Figure 4B:
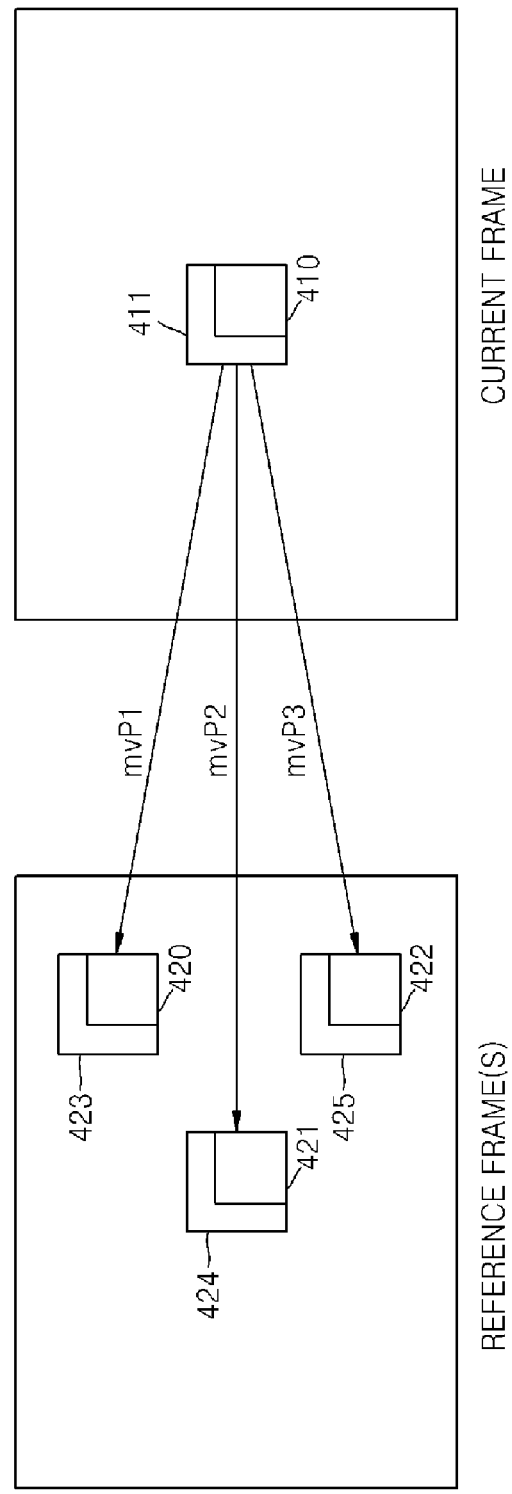
FIGS. 4B and 4C are views for explaining calculation of spatial similarities between neighboring pixels that are adjacent to the current block and neighboring pixels that are adjacent to each reference block that corresponds to the current block according to an exemplary embodiment of the present invention.
Figure 4C:
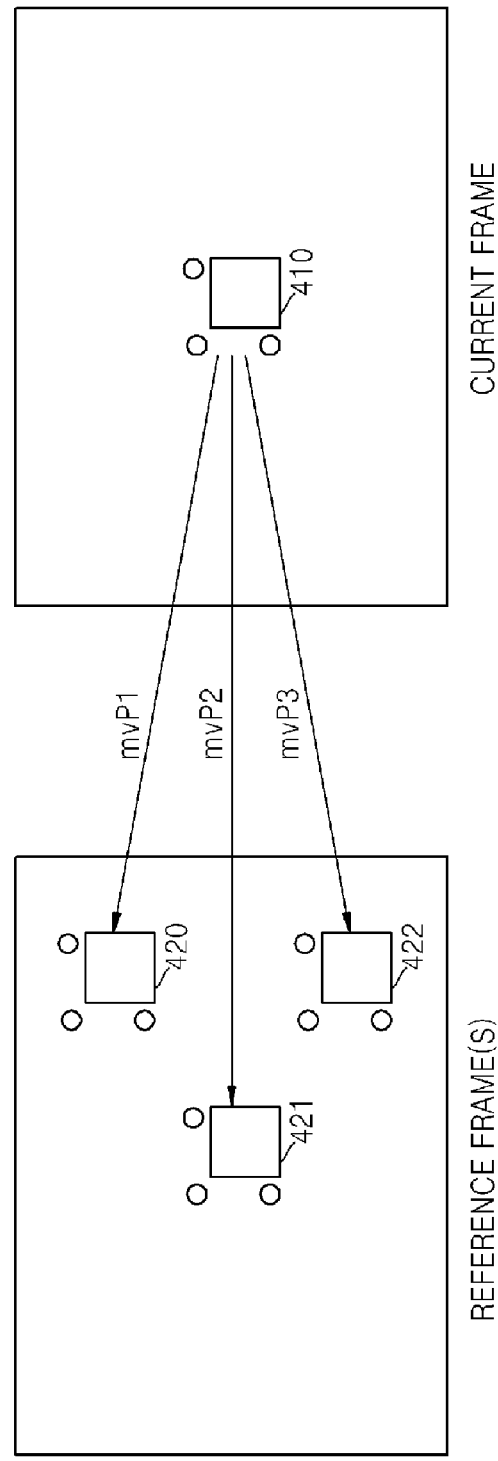

FIG. 3B is a flowchart of a method of estimating a motion vector of a current block according to another exemplary embodiment of the present invention, and FIGS. 4B and 4C are views for explaining calculation of spatial similarities between pixels that are adjacent to the current block and pixels that are adjacent to each block that corresponds to the current block according to an exemplary embodiment of the present invention. Referring to FIGS. 3B, in operation 310, at least one reference frame is searched using motion vectors of the plurality of neighboring partitions A, B, C, A1, A2, B1, B2, and C that are adjacent to a current block 410 in order to search for blocks 420 through 422 that correspond to the current block 410. It is assumed that the current block 410 is the same as the current block E illustrated in FIG. 3A.

The motion vectors of the neighboring partitions A, B, C, A1, A2, B1, B2, and C are estimated as the motion vector of the current block 410. For example, the motion vector of the partition A illustrated in FIG. 3A may be an estimated motion vector MVP1, the motion vector of the partition B illustrated in FIG. 3A may be an estimated motion vector MVP2, and the motion vector of the partition C illustrated in FIG. 3A may be an estimated motion vector MVP3.

In operation 311, similarities between neighboring pixels 423 through 425 that are adjacent to the found blocks 420 through 422 corresponding to the current block 410 and neighboring pixels 411 that are adjacent to the current block 410 are calculated.

Preferably, but not necessarily, the similarities may be calculated by calculating sums of absolute differences (SADs) between the pixels 423 through 425 and the pixels 411.

For SAD calculation in operation 311, it is not necessary to use all the neighboring pixels 423 through 425 that are adjacent to the blocks 420 through 422 corresponding to the current block 410 and the neighboring pixels 411 that are adjacent to the current block 410. As illustrated in FIG. 4C, the similarities may be calculated by calculating SADs between only some of the neighboring pixels 423 through 425 and the neighboring pixels 411. In FIG. 4C, among the neighboring pixels 423 through 425 and the neighboring pixels 411, only neighboring pixels that are located to the left of and above, to the right of and above, and to the left of and below a corresponding block are used to calculate the similarities.

In operation 312, one of the motion vectors of the neighboring partitions A, B, C, A1, A2, B1, B2, and C is estimated as the motion vector of the current block based on the similarities calculated in operation 311.

If SADs have been calculated for the similarities in operation 311, a motion vector used to search for a block that is adjacent to pixels having the smallest SAD is estimated as the motion vector of the current block. For example, if an SAD between the neighboring pixels 411 of the current block 410 and the neighboring pixels 423 of the block 420 found using the motion vector MVP1 is smallest among the calculated SADs and thus a similarity between the neighboring pixels 411 and the neighboring pixels 423 is highest, the motion vector used to search for the block 410, i.e., the motion vector MVP1, is estimated as the motion vector of the current block.

However, it is not necessary to estimate a motion vector used to search for a block that is adjacent to pixels having the smallest SAD as the motion vector of the current block. In spite of corresponding to the smallest SAD, the motion vector may not be an appropriately estimated motion vector when considering the overall rate-distortion (R-D) cost of the current block. Therefore, N motion vector candidates, i.e., a plurality of motion vector candidates corresponding to smaller SADs, are selected and a motion vector guaranteeing low R-D cost among the selected motion vector candidates is estimated as the motion vector of the current block.

In this case, information indicating which motion vector has among the plurality of motion vector candidates been estimated as the motion vector of the current block has to be transmitted to a decoder.

It is assumed that motion vectors MVP1 and MVP2 among motion vectors MVP1, MPV2, and MVP3 illustrated in FIG. 4B correspond to small SADs and an SAD corresponding to the motion vector MVP1 is smaller than an SAD corresponding to the motion vector MVP2. The two motion vectors MVP1 and MVP2 are estimated as the motion vector of the current block and encoding is performed using the estimated motion vector. As a result of encoding, if it is determined that an R-D cost corresponding to a case where the motion vector MVP2 is estimated as the motion vector of the current block is lower than that corresponding to the other case, the motion vector MVP2 is estimated as the motion vector of the current block.

As discussed above with reference to FIGS. 3B, 4B, and 4C, it is not necessary to use the pixels 411 and the pixels 423 through 425 that are immediately adjacent to the borders of the block 410 and the blocks 420 through 422 for similarity calculation. Pixels spaced by a predetermined distance from the borders of the block 410 and the blocks 420 through 422 may also be used as long as they have correlations with the block 410 and the blocks 420 through 422.

However, those of ordinary skill in the art may understand that the methods described above are only examples and various combinations are available.

Figure 5A:
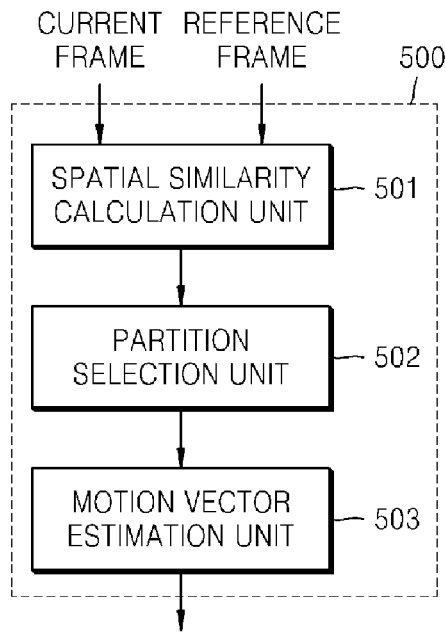
FIG. 5A is a block diagram of an apparatus for estimating a motion vector according to an exemplary embodiment of the present invention.

FIG. 5A is a block diagram of an apparatus 500 for estimating a motion vector according to an exemplary embodiment of the present invention. Referring to FIG. 5A, the apparatus 500 includes a spatial similarity calculation unit 501, a partition selection unit 502, and a motion vector estimation unit 503.

The spatial similarity calculation unit 501 calculates an average value of pixels of the current block E and an average value of pixels of each of the neighboring partitions A, B, A1, A2, B1, B2, and C around the current block E. The calculated averages are transmitted to the partition selection unit 502.

If the average value of the pixels of the current block E is a first average and the average value of the pixels of each of the neighboring partitions A, B, A1, A2, B1, B2, and C is a second average, the partition selection unit 502 selects a neighboring partition (or neighboring partitions) as a predictor of the current block E when an absolute value of a difference between the first average and the second average corresponding to the neighboring partition is less than a predetermined threshold. Information about the selected neighboring partition(s) is transmitted to the motion vector estimation unit 503.

The motion vector estimation unit 503 estimates the motion vector of the current block E using a motion vector (or motion vectors) of the selected neighboring partition(s) as described above with reference to FIGS. 3A and 4A. At least two neighboring partitions may be selected and motion estimation in this case may be performed as described above with reference to FIGS. 3A and 4A.

Figure 5B:
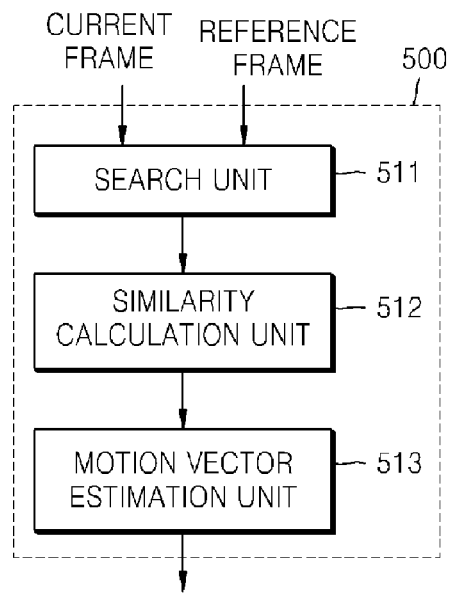
FIG. 5B is a block diagram of an apparatus for estimating a motion vector according to another exemplary embodiment of the present invention.

FIG. 5B is a block diagram of the apparatus 500 for estimating a motion vector according to another exemplary embodiment of the present invention. Referring to FIG. 5B, the apparatus 500 includes a search unit 511, a similarity calculation unit 512, and a motion vector estimation unit 513.

The search unit 511 searches at least one reference frame using the motion vectors of the plurality of neighboring partitions A, B, C, A1, A2, B1, B2, and C that are adjacent to the current block 410 in order to search for the blocks 420 through 422 corresponding to the current block 410. As set forth with reference to FIG. 3B, the current block 410 is assumed to be the same as the current block E illustrated in FIG. 3A.

The similarity calculation unit 512 calculates similarities between the neighboring pixels 423 through 425 that are adjacent to the found blocks 420 through 422, respectively, and the neighboring pixels 411 that are adjacent to the current block 410.

For similarity calculation, the similarity calculation unit 512 calculates SADs between the neighboring pixels 423 through 425 and the neighboring pixels 411.

The motion vector estimation unit 513 estimates the motion vector of the current block 410 based on the calculation result obtained by the similarity calculation unit 512. Detailed methods for motion vector estimation have already been described with reference to FIGS. 3B, 4B, and 4C.

Figure 6:
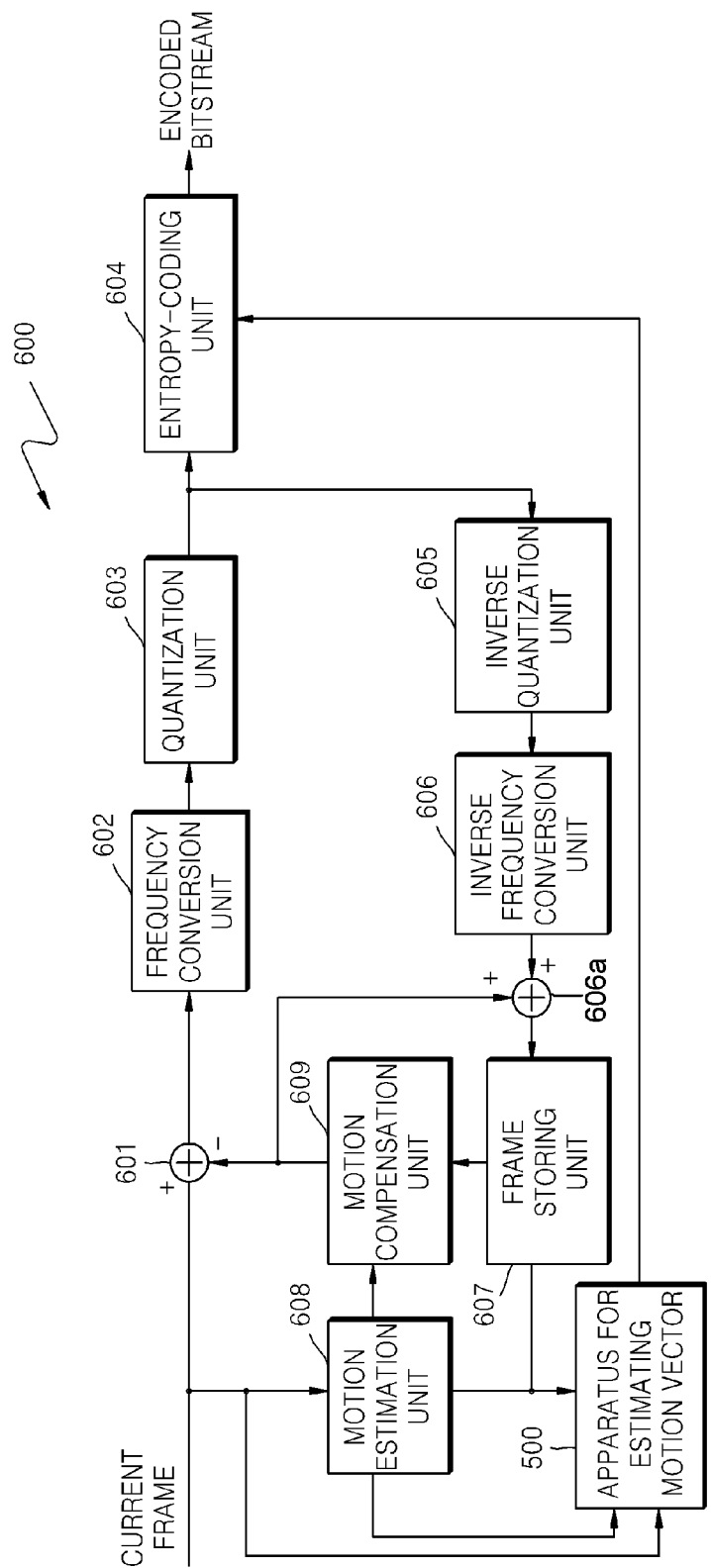
FIG. 6 is a block diagram of an encoder including the apparatus for estimating a motion vector according to an exemplary embodiment of the present invention.

FIG. 6 is a block diagram of an encoder 600 including the apparatus 500 according to an exemplary embodiment of the present invention.

Referring to FIG. 6, an addition unit 601 calculates a difference between image data of a current frame input from the outside and motion-compensated video data received from a motion compensation unit 609 and transmits the difference to a frequency conversion unit 602. If a current macroblock is subject to inter-mode coding, the addition unit 601 outputs the difference between the image data input from the outside and the motion-compensated image data to the frequency conversion unit 602.

The frequency conversion unit 602 performs discrete cosine transformation (DCT) on image data received from the addition unit 601 in order to convert spatial-domain values into frequency-domain values and outputs the conversion frequency-domain values to a quantization unit 603.

The quantization unit 603 quantizes the frequency-domain values received from the frequency conversion unit 602 and outputs the quantized frequency-domain values to an entropy-coding unit 604.

The entropy-coding unit 604 performs entropy-coding on the quantized frequency-domain values received from the quantization unit 603, on motion information, and on partition information received from the apparatus 500 in order to generate an encoded bitstream.

An inverse quantization unit 605, an inverse frequency conversion unit 606, a frame storing unit 607, a motion estimation unit 608, the motion compensation unit 609, and the apparatus 500 constitute a set of modules/devices for motion compensation.

The inverse quantization unit 605 performs inverse quantization on the quantized frequency-domain values received from the quantization unit 603 and outputs the inversely quantized frequency-domain values to the inverse frequency conversion unit 606.

The inverse frequency conversion unit 606 converts the inversely quantized frequency-domain values received from the inverse quantization unit 605 into spatial-domain values and outputs the spatial-domain values to an addition unit 606a.

The addition unit 606a adds image data output from the inverse frequency conversion unit 606 to image data received from the motion compensation unit 609 in order to generate reference image data for motion compensation. The generated reference image data is stored in the frame storing unit 607.

The frame storing unit 607 stores image data of a reference frame received from the addition unit 606a.

The motion estimation unit 608 performs motion estimation between image data of a current frame input from the outside and image data stored in the frame storing unit 607 in order to calculate motion vectors. The motion vectors calculated by the motion estimation unit 608 are transmitted to the motion compensation unit 609 and the apparatus 500.

The motion compensation unit 609 performs motion compensation on image data stored in the frame storing unit 607 using the motion vectors calculated by the motion estimation unit 608 in order to generate motion-compensated image data. The motion-compensated image data is transmitted to the addition unit 601 and the addition unit 606a.

The apparatus 500 includes the spatial similarity calculation unit 501, the partition selection unit 502, and the motion vector estimation unit 503 as described with reference to FIG. 5A. The spatial similarity calculation unit 501 calculates an average value of pixels of the current block E and an average value of pixels of each of the neighboring partitions A, B, A1, A2, B1, B2, and C around the current block E.

If the average value of pixels of the current block E is a first average and the average value of pixels of each of the neighboring partitions A, B, A1, A2, B1, B2, and C is a second average, the partition selection unit 502 selects a neighboring partition (or neighboring partitions) as a predictor of the current block E when an absolute value of a difference between the first average and the second average corresponding to the neighboring partition is less than a predetermined threshold. Information about the selected neighboring partition(s) is transmitted to the motion vector estimation unit 503.

The motion vector estimation unit 503 estimates the motion vector of the current block E using a motion vector (or motion vectors) of the selected neighboring partition(s). The partition information and motion information are output to the entropy-coding unit 604. The motion information indicates a difference between the estimated motion vector of the current block and the motion vector of the selected neighboring partition.

These methods have already been described in detail with reference to FIGS. 3A and 4A.

According to another exemplary embodiment of the present invention, the apparatus 500 includes the search unit 511, the similarity calculation unit 512, and the motion vector estimation unit 513 as illustrated in FIG. 5B. The search unit 511 searches at least one reference frame(s) using the motion vectors of the plurality of neighboring partitions A, B, C, A1, A2, B1, B2, and C that are adjacent to the current block 410 in order to search for the blocks 420 through 422 corresponding to the current block.

The similarity calculation unit 512 calculates similarities between the neighboring pixels 423 through 425 that are adjacent to the found blocks 420 through 422, respectively, and the neighboring pixels 411 that are adjacent to the current block 410. For similarity calculation, the similarity calculation unit 512 calculates SADs between the neighboring pixels 423 through 425 and the neighboring pixels 411.

The motion vector estimation unit 513 estimates the motion vector of the current block 410 based on the calculation result obtained by the similarity calculation unit 512. Partition information and motion information are output to the entropy-coding unit 604. The motion information indicates a difference between the estimated motion vector of the current block and the motion vector of the neighboring partition used to estimate the motion vector of the current block.

Detailed methods for motion vector estimation have already been described with reference to FIGS. 3B, 4B, and 4C.

Figure 7:
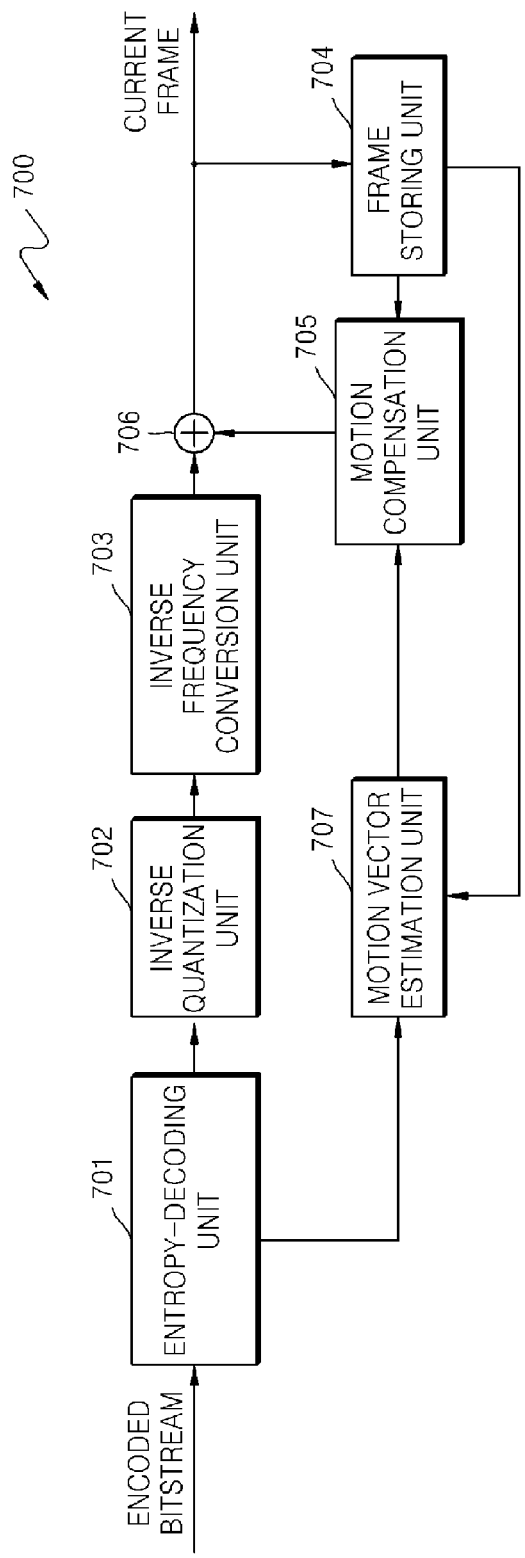
FIG. 7 is a block diagram of a decoder according to an exemplary embodiment of the present invention.

FIG. 7 is a block diagram of a decoder 700 according to an exemplary embodiment of the present invention, in which the decoder 700 includes an entropy-decoding unit 701, an inverse quantization unit 702, an inverse frequency conversion unit 703, a frame storing unit 704, a motion compensation unit 705, an addition unit 706, and a motion vector estimation unit 707.

Referring to FIG. 7, the entropy-decoding unit 701 performs entropy-decoding on an encoded bitstream and transmits the entropy-decoded bitstream to the inverse quantization unit 703 and the motion vector estimation unit 707. In particular, in the case of inter-mode coding, the entropy-decoding unit 701 extracts motion information and partition information associated with the current macroblock and entropy-decoded image data and outputs the extracted image data to the inverse quantization unit 702 and the extracted motion information and partition information to the motion vector estimation unit 707.

The inverse quantization unit 702 performs inverse quantization on the entropy-decoded image data output from the entropy-decoding unit 702 and outputs the inversely quantized image data to the inverse frequency conversion unit 703.

The inverse frequency conversion unit 703 converts the inversely quantized image data output from the inverse quantization unit 702 into spatial-domain values and outputs the spatial-domain values to the addition unit 706.

The addition unit 706 adds the motion-compensated image data received from the motion compensation unit 705 to the inversely quantized image data received from the inverse frequency conversion unit 703 in order to generate reconstructed image data. The output of the addition unit 706 is decoded image data of the current frame.

The frame storing unit 704 stores image data of a frame, which is output from the addition unit 706.

The motion vector estimation unit 707 estimates a motion vector of the current block using the motion information extracted by the entropy-decoding unit 701 and a reference block of the frame storing unit 704. The estimated motion vectors are output to the motion compensation unit 705.

More specifically, the motion vector estimation unit 707 estimates the motion vector of the current block in the same way as the apparatus 500 included in the encoder 600 illustrated in FIG. 6 estimates the motion vector. Thus, the motion vector estimation unit 707 may be configured in the same manner as the apparatus 500 illustrated in FIG. 6.

The motion compensation unit 705 applies motion vectors and partition information received from the motion vector estimation unit 707 to image data of a reference frame stored in the frame storing unit 704 in order to perform motion compensation. The motion-compensated image data is output to the addition unit 706.

Figure 8:
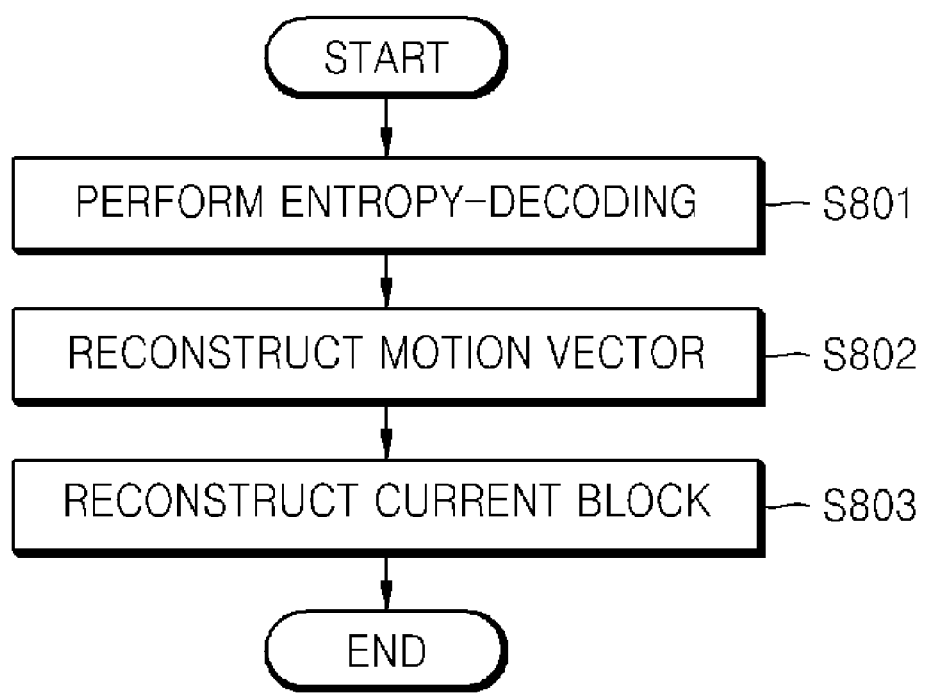
FIG. 8 is a flowchart of a decoding method according to an exemplary embodiment of the present invention.

FIG. 8 is a flowchart of a decoding method according to an exemplary embodiment of the present invention.

Referring to FIG. 8, entropy-decoding is performed on motion information, partition information, and a residual block from an encoded bitstream in operation S801.

In operation S802, a motion vector of the current block is reconstructed using the decoded motion information and partition information. More specifically, spatial similarities between the current block and a plurality of neighboring partitions around the current block are calculated based on the decoded partition information. At least one of the neighboring partitions is selected based on the calculated spatial similarities and a motion vector of the selected neighboring partition is estimated as the motion vector of the current block. Next, the motion information is added to the estimated motion vector in order to reconstruct the motion vector of the current block.

According to another exemplary embodiment of the present invention, at least one reference frame(s) is searched using motion vectors of a plurality of neighboring partitions around the current block, which are determined based on decoded partition information, in order to search for blocks corresponding to the current block. Similarities between neighboring pixels that are adjacent to the found blocks, respectively, and neighboring pixels that are adjacent to the current block are calculated. One of the motion vectors of the neighboring partitions is estimated as the motion vector of the current block based on the calculation result, and decoded motion information is added to the estimated motion vector in order to reconstruct the motion vector of the current block.

In operation S803, the motion vector reconstructed in operation S802 is applied to the decoded reference block in order to generate a motion-compensated block. In addition, the residual block is entropy-decoded in operation S801 and then undergoes inverse quantization and inverse frequency conversion in order to generate a spatial-domain residual block. The motion-compensated block and the spatial-domain residual block are added together in order to generate the current block.

Since it is apparent that neighboring partitions can also be used for the decoding method and the decoder in order to estimate the motion vector of the current block in the same manner as in the encoder, a detailed description thereof will be omitted.

As described above, according to the exemplary embodiments of the present invention, by estimating useful partitions for estimation of the motion vector of the current block and processing information about the estimated partitions, the amount of information transmitted to the decoder can be reduced.

The present invention can also be embodied as computer-readable code on a computer-readable recording medium. The computer-readable recording medium is any data storage device that can store data which can be thereafter read by a computer system. Examples of computer-readable recording media include read-only memory (ROM), random-access memory (RAM), CD-ROMs, magnetic tapes, floppy disks, and optical data storage devices. The computer-readable recording medium can also be distributed over a network of coupled computer systems so that the computer-readable code is stored and executed in a decentralized fashion.

While the present invention has been particularly shown and described with reference to an exemplary embodiment thereof, it will be understood by those of ordinary skill in the art that various changes in form and detail may be made therein without departing from the spirit and scope of the present invention as defined by the following claims.

What is claimed is:

1. A method of estimating a motion vector of a current block, the method comprising:
    obtaining spatial similarities between the current block and a plurality of neighboring partitions around the current block;
    selecting at least one of the neighboring partitions based on the obtained spatial similarities; and
    estimating a motion vector of the selected partition as the motion vector of the current block,
    wherein a size of the plurality of neighboring partitions are smaller than the size of the current block, and
    wherein the obtaining the spatial similarities comprises obtaining spatial similarities based on an average value of pixels of the current block and an average value of pixels of each of the neighboring partitions.

2. The method of claim 1, wherein the obtaining the spatial similarities comprises obtaining the average value of the pixels of the current block using pixels that are contiguous with the current block from among the pixels of the neighboring partitions.

3. The method of claim 1, wherein the obtaining the spatial similarities, the spatial similarities are allocated to the neighboring partitions according to a spatial order previously agreed between an encoder and a decoder.

4. The method of claim 1, further comprising transmitting motion information between the motion vector of the current block and the estimated motion vector of the current block and partition information for reconstruction of the motion vector of the current block.

5. The method of claim 1, wherein in the estimating, if a plurality of neighboring partitions are selected, a motion vector of one of the selected neighboring partitions is estimated as the motion vector of the current block.

6. The method of claim 1, wherein in the estimating, if a plurality of neighboring partitions are selected, a median value of motion vectors of the selected neighboring partitions is estimated as the motion vector of the current block.

7. The method of claim 1, wherein in the estimating, if a plurality of neighboring partitions are selected, a sum of weighted motion vectors of the selected neighboring partitions is estimated as the motion vector of the current block.

8. The method of claim 1, wherein in the estimating, a motion vector of a partition in a reference frame, which is located in a spatially same position as the current block, is estimated as the motion vector of the current block.

9. A non-transitory computer-readable recording medium having recorded thereon a program for executing the method of claim 1.

10. An apparatus for estimating a motion vector of a current block, the apparatus comprising:
a spatial similarity calculation unit which obtains spatial similarities between the current block and a plurality of neighboring partitions around the current block;
a partition selection unit which selects at least one of the neighboring partitions based on the obtained spatial similarities; and
a motion vector estimation unit which estimates a motion vector of the selected partition as the motion vector of the current block,
wherein a size of the plurality of neighboring partitions are smaller than the size of the current block, and
wherein the spatial similarity calculation unit obtains the spatial similarities based on an average value of pixels of the current block and an average value of pixels of each of the neighboring partitions.

11. The apparatus of claim 10, wherein the spatial similarity calculation unit obtains the average value of the pixels of the current block using pixels that are contiguous with the current block from among the pixels of the neighboring partitions.

12. The apparatus of claim 10, wherein during the obtaining of the spatial similarities, the spatial similarities are allocated to the neighboring partitions according to a spatial order previously agreed between an encoder and a decoder.

13. The apparatus of claim 10, wherein the motion vector estimation unit transmits motion information between the motion vector of the current block and the estimated motion vector of the current block and partition information for reconstruction of the motion vector of the current block.

14. The apparatus of claim 10, wherein if a plurality of neighboring partitions are selected, the motion vector estimation unit estimates a motion vector of one of the selected neighboring partitions as the motion vector of the current block.

15. The apparatus of claim 10, wherein if a plurality of neighboring partitions are selected, the motion vector estimation unit estimates a median value of motion vectors of the selected neighboring partitions as the motion vector of the current block.

16. The apparatus of claim 10, wherein if a plurality of neighboring partitions are selected, the motion vector estimation unit estimates a sum of weighted motion vectors of the selected neighboring partitions as the motion vector of the current block.

17. The apparatus of claim 10, wherein the motion vector estimation unit estimates a motion vector of a partition in a reference frame, which is located in a spatially same position as the current block, as the motion vector of the current block.

18. A video encoder comprising:
a motion estimation unit which generates a current block and a motion vector of each of a plurality of neighboring partitions around the current block;
a motion vector estimation unit which obtains spatial similarities between the current block and the plurality of neighboring partitions around the current block, selects at least one of the neighboring partitions based on the obtained spatial similarities, and estimates a motion vector of the selected partition as the motion vector of the current block; and
an entropy-coding unit which performs entropy-coding on motion information between the motion vector of the current block and the estimated motion vector of the current block and partition information for reconstruction of the motion vector of the current block,
wherein a size of the plurality of neighboring partitions are smaller than the size of the current block, and
wherein the motion vector estimation unit obtains the spatial similarities based on an average value of pixels of the current block and an average value of pixels of each of the neighboring partitions.

19. The video encoder of claim 18, wherein the motion vector estimation unit obtains the average value of the pixels of the current block using pixels that are contiguous with the current block from among the pixels of the neighboring partitions.

20. The video encoder of claim 18, wherein during the obtaining of the spatial similarities, the spatial similarities are allocated to the neighboring partitions according to a spatial order previously agreed between an encoder and a decoder.

21. The video encoder of claim 18, wherein the motion vector estimation unit transmits motion information between the motion vector of the current block and the estimated motion vector of the current block and partition information for reconstruction of the motion vector of the current block.

22. The video encoder of claim 18, wherein if a plurality of neighboring partitions are selected, the motion vector estimation unit estimates a motion vector of one of the selected neighboring partitions as the motion vector of the current block.

23. The video encoder of claim 18, wherein if a plurality of neighboring partitions are selected, the motion vector estimation unit estimates the median value of motion vectors of the selected neighboring partitions as the motion vector of the current block.

24. The video encoder of claim 18, wherein if a plurality of neighboring partitions are selected, the motion vector estimation unit estimates a sum of weighted motion vectors of the selected neighboring partitions as the motion vector of the current block.

25. The video encoder of claim 18, wherein the motion vector estimation unit estimates a motion vector of a partition in a reference frame, which is located in a spatially same position as the current block, as the motion vector of the current block.

26. A video decoder comprising:
an entropy-decoding unit which performs entropy-decoding on a residual block, motion information, and partition information from an encoded bitstream;
a motion vector estimation unit which obtains spatial similarities between a current block and a plurality of neighboring partitions around the current block, selects at least one of the neighboring partitions based on the obtained spatial similarities, estimates a motion vector of the selected partition as the motion vector of the current block, and adds the decoded motion information to the estimated motion vector of the current block in order to reconstruct the motion vector of the current block; and a macroblock reconstruction unit which reconstructs the current block from the decoded residual block using the reconstructed motion vector, wherein a size of the plurality of neighboring partitions are smaller than the size of the current block, and wherein the motion vector estimation unit obtains the spatial similarities based on an average value of pixels of the current block and an average value of pixels of each of the neighboring partitions.

27. The video decoder of claim 26, wherein the motion vector estimation unit obtains the average value of the pixels of the current block using pixels that are contiguous with the current block from among the pixels of the neighboring partitions.

28. The video decoder of claim 26, wherein during the obtaining the spatial similarities, the spatial similarities are allocated to the neighboring partitions according to a spatial order previously agreed between an encoder and a decoder.

29. The video decoder of claim 26, wherein if a plurality of neighboring partitions are selected, the motion vector estimation unit estimates a motion vector of one of the selected neighboring partitions as the motion vector of the current block.

30. The video decoder of claim 26, wherein if a plurality of neighboring partitions are selected, the motion vector estimation unit estimates the median value of motion vectors of the selected neighboring partitions as the motion vector of the current block.

31. The video decoder of claim 26, wherein if a plurality of neighboring partitions are selected, the motion vector estimation unit estimates a sum of weighted motion vectors of the selected neighboring partitions as the motion vector of the current block.

32. The video decoder of claim 26, wherein the motion vector estimation unit estimates a motion vector of a partition in a reference frame, which is located in a spatially same position as the current block, as the motion vector of the current block.

33. A decoding method comprising:

performing entropy-decoding on a residual block, motion information, and partition information from an encoded bitstream;

obtaining spatial similarities between a current block and a plurality of neighboring partitions around the current block, selecting at least one of the neighboring partitions based on the obtained spatial similarities, estimating a motion vector of the selected partition as the motion vector of the current block, and adding the decoded motion information to the estimated motion vector of the current block in order to reconstruct the motion vector of the current block; and reconstructing the current block from the decoded residual block using the reconstructed motion vector, wherein a size of the plurality of neighboring partitions are smaller than the size of the current block, and wherein the obtaining the spatial similarities comprises obtaining the spatial similarities based on an average value of pixels of the current block and an average value of pixels of each of the neighboring partitions.

34. The decoding method of claim 33, wherein the obtaining the spatial similarities comprises calculating the average value of the pixels of the current block using pixels that are contiguous with the current block from among the pixels of the neighboring partitions.

35. The decoding method of claim 33, wherein during the obtaining the spatial similarities, the spatial similarities are allocated to the neighboring partitions according to a spatial order previously agreed between an encoder and a decoder.

36. The decoding method of claim 33, wherein if a plurality of neighboring partitions are selected, the estimating comprises estimating a motion vector of one of the selected neighboring partitions as the motion vector of the current block.

37. The decoding method of claim 33, wherein if a plurality of neighboring partitions are selected, the estimating comprises estimating the median value of motion vectors of the selected neighboring partitions as the motion vector of the current block.

38. The decoding method of claim 33, wherein if a plurality of neighboring partitions are selected, a sum of weighted motion vectors of the selected neighboring partitions is estimated as the motion vector of the current block.

39. The decoding method of claim 33, wherein the estimating comprises estimating a motion vector of a partition in a reference frame, which is located in a spatially same position as the current block, as the motion vector of the current block.

40. A non-transitory computer-readable recording medium having recorded thereon a program for executing the decoding method of claim 33.

* * * * *